(12) United States Patent
Liu et al.

(10) Patent No.: US 12,480,413 B2
(45) Date of Patent: Nov. 25, 2025

(54) INTERNAL ALUMINIZATION OF COATED SUBSTRATES

(71) Applicant: RTX Corporation, Farmington, CT (US)

(72) Inventors: Xuan Liu, Glastonbury, CT (US); Brian T. Hazel, Avon, CT (US); Danielle E. Jencks, East Lyme, CT (US); Teresa A Munger, Manchester, CT (US); Glenn A. Cotnoir, Thompson, CT (US); Kevin W. Schlichting, South Glastonbury, CT (US); Shaun M. Enos, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/888,810

(22) Filed: Sep. 18, 2024

(65) Prior Publication Data
US 2025/0092793 A1      Mar. 20, 2025

Related U.S. Application Data

(60) Provisional application No. 63/539,075, filed on Sep. 18, 2023.

(51) Int. Cl.
*F01D 5/28* (2006.01)
*C23C 24/10* (2006.01)
*F01D 5/18* (2006.01)

(52) U.S. Cl.
CPC ............ *F01D 5/288* (2013.01); *C23C 24/103* (2013.01); *F01D 5/18* (2013.01); *F05D 2230/90* (2013.01); *F05D 2300/611* (2013.01)

(58) Field of Classification Search
CPC ... F01D 5/288; C23C 24/103; F05D 2230/90; F05D 2300/611
See application file for complete search history.

(56) References Cited

U.S. PATENT DOCUMENTS

| 4,419,416 A | 12/1983 | Gupta et al. |
| 5,366,765 A | 11/1994 | Milaniak et al. |

(Continued)

FOREIGN PATENT DOCUMENTS

EP      0619856 B1      11/1999

OTHER PUBLICATIONS

European Search Report dated Jan. 16, 2025 for European Patent Application No. 24201062.7.

*Primary Examiner* — Sabbir Hasan
(74) *Attorney, Agent, or Firm* — Bachman & LaPointe, P.C.

(57) ABSTRACT

A method for coating a component having: a metallic substrate; a ceramic coating having one or more ceramic coating layers atop the substrate; and a cooling passageway system comprising a plurality of feed passageways extending from one or more inlet ports and a plurality of outlet passageways. The outlet passageways have openings in the coating. The method involves: applying a slurry aluminide to the plurality of outlet passageways; coupling the one or more inlets to a suction source; applying an external gas flow to the component, the suction source drawing the external gas in through the outlet passageways and out through the one or more inlet ports, the external gas flow comprising at least 50% by volume combined one to all of Ar, He, and $H_2$; and while the suction source is drawing the external gas, heating the component to aluminize the cooling passageway system.

20 Claims, 5 Drawing Sheets

(56) References Cited

U.S. PATENT DOCUMENTS

| | | |
|---|---|---|
| 5,514,482 A | 5/1996 | Strangman |
| 5,795,659 A | 8/1998 | Meelu et al. |
| 6,435,830 B1 | 8/2002 | Allen et al. |
| 6,586,052 B2 | 7/2003 | Creech et al. |
| 7,829,142 B2 | 11/2010 | Kool et al. |
| 8,839,739 B2 | 9/2014 | Soucy et al. |
| 9,909,202 B2 * | 3/2018 | Zhang .................. C23C 10/14 |
| 10,407,762 B2 | 9/2019 | Tang et al. |
| 10,633,740 B2 | 4/2020 | Melnik et al. |
| 2015/0315694 A1 | 11/2015 | Zhang et al. |
| 2016/0222803 A1 | 8/2016 | Livings |
| 2023/0052105 A1 * | 2/2023 | Craig .................. F01D 5/005 |

* cited by examiner

INTERNAL ALUMINIZATION OF COATED SUBSTRATES

CROSS-REFERENCE TO RELATED APPLICATION

Benefit is claimed of U.S. Patent Application No. 63/539,075, filed Sep. 18, 2023, and entitled "Internal Aluminization of Coated Substrates", the disclosure of which is incorporated by reference herein in its entirety as if set forth at length.

BACKGROUND

The disclosure relates to gas turbine engines. More particularly, the disclosure relates to internal aluminization of cooled parts having ceramic coatings.

Gas turbine engines (used in propulsion and power applications and broadly inclusive of turbojets, turboprops, turbofans, turboshafts, industrial gas turbines, and the like) include metallic components (e.g., with nickel-based superalloy substrates) having ceramic barrier and other coatings (e.g., environmental barrier coatings (EBC), thermal barrier coatings (TBC), abradable coatings, and the like) and corrosion coatings. The ceramic coatings are typically along gas-path-facing surfaces. Corrosion coatings are typically on other surfaces such as internal cooling passageway surfaces, blade and vane platform underside surfaces, vane shroud outer diameter (OD) surfaces, and the like.

Turbine blades require protection on the airfoil gaspath surface, the tip and under platform regions for differing failure modes. They also require a thermal barrier coating (TBC) to be deposited on the airfoil surface to give it thermal protection with exceptional spall life. Currently, multiple steps are required to coat each of these areas with different coatings for adequate protection. An example may require a platinum plating step (overall exterior), an aluminizing step (overall interior and exterior), heat treatment (forms the aluminide from the prior steps), application of overlay coatings (under platform such as high-Cr MCrAlY by cathodic arc or LPPS), heat treatment, then chromizing (e.g., slurry chromizing under platform particularly NLOS regions missed by the high-Cr MCrAlY) and heat treatment step, finally a TBC application (ceramic principally to gaspath surfaces such as EB-PVD). This can make manufacturing complex, challenging, difficult to mask (certain regions) and expensive.

The aluminization/aluminide on internal passageways improves oxidation resistance. Thus, interior aluminization is known even in the absence of aluminization for the exterior bondcoat.

U.S. Pat. No. 6,435,830, Allen et al., Aug. 20, 2002, "Article having corrosion resistant coating", (the '830 patent), the disclosure of which is incorporated by reference in its entirety herein as if set forth at length, discloses a high-Cr MCrAlY along the under-platform surfaces of a blade.

Alternatively to an aluminide, a high-Al MCrAlY may be used as a bondcoat for a ceramic barrier coat on the gaspath surfaces. An example is shown in US Patent U.S. Pat. No. 4,419,416A, Gupta et al., Dec. 6, 1983, "Overlay coatings for superalloys", (the '416 patent), the disclosure of which is incorporated by reference in its entirety herein as if set forth at length.

During aluminization of the internal cooling passageways, it is known to mask exterior portions of the substrate against contamination from the aluminization vapors. This can limit degradation of finished surfaces (e.g., pre-machined root surfaces or surfaces that are to receive subsequent bondcoat application (e.g., along the gaspath-facing surfaces)). U.S. Pat. No. 5,366,765, Milaniak et al., Nov. 22, 1994, "Aqueous Slurry Coating System for Aluminide Coatings" (the '765 patent), the disclosure of which is incorporated by reference in its entirety herein as if set forth at length, discloses pack aluminization of internal passageways using halide activator.

U.S. Pat. No. 8,839,739B2, "MASKING APPARATUS", Soucy et al., Sep. 23, 2014 (the '739 patent), the disclosure of which is incorporated by reference in its entirety herein as if set forth at length, discloses a two-piece masking apparatus that encloses the entire blade.

U.S. Pat. No. 10,407,762B2, Tang et al., Sep. 10, 2019, "Mask formulation to prevent aluminizing onto the pre-existing chromide coating" (the '762 patent), the disclosure of which is incorporated by reference in its entirety herein as if set forth at length, discloses a mask for preventing chromium depletion while preventing an aluminide coating to be deposited on the masked area.

U.S. Pat. No. 5,514,482, Strangman, May 7, 1996, "Thermal Barrier Coating System for Superalloy Components", discloses aluminide or modified aluminide with the addition of a ceramic coating (thermal barrier coating (TBC)) applied on top with a method such as EB-PVD.

SUMMARY

One aspect of the disclosure involves a method for coating a component, the component comprising: a metallic substrate; a ceramic coating having one or more ceramic coating layers atop the substrate; and a cooling passageway system comprising a plurality of feed passageways extending from one or more inlet ports and a plurality of outlet passageways. The outlet passageways have openings in the coating. The method comprises: applying a slurry aluminide to the plurality of outlet passageways; coupling the one or more inlets to a suction source; applying an external gas flow to the component, the suction source drawing the external gas in through the outlet passageways and out through the one or more inlet ports, the external gas flow comprising at least 50% by volume combined one to all of Ar, He, and $H_2$; and while the suction source is drawing the external gas, heating the component to aluminize the cooling passageway system.

In a further embodiment of any of the foregoing embodiments, additionally and/or alternatively, the heating is at a temperature of at least 1000° C.

In a further embodiment of any of the foregoing embodiments, additionally and/or alternatively, the slurry aluminide comprises Al—Si and/or Al—Si—Y powder in a carrier.

In a further embodiment of any of the foregoing embodiments, additionally and/or alternatively, the slurry aluminide comprises no more than 10% by weight combined alumina and silica, if any.

In a further embodiment of any of the foregoing embodiments, additionally and/or alternatively, the slurry aluminide is introduced by injection from outlets of the outlet passageways.

In a further embodiment of any of the foregoing embodiments, additionally and/or alternatively, the external gas flow is commenced prior to the heating and maintained throughout the heating.

A further embodiment of any of the foregoing embodiments additionally and/or alternatively further comprises interior and exterior grit blast after the aluminizing of the cooling passageway system.

In a further embodiment of any of the foregoing embodiments, additionally and/or alternatively, the component is held by a fixture in a sealed retort in a heat treating furnace for the heating.

In a further embodiment of any of the foregoing embodiments, additionally and/or alternatively, the retort is a nickel-based superalloy or silicon carbide composite.

In a further embodiment of any of the foregoing embodiments, additionally and/or alternatively, the metallic substrate is a nickel-based alloy.

In a further embodiment of any of the foregoing embodiments, additionally and/or alternatively a manufacture method includes the coating method and further comprises: applying a bondcoat to the substrate; and applying the ceramic coating atop the bondcoat.

In a further embodiment of any of the foregoing embodiments, additionally and/or alternatively: the ceramic is a yttria-stabilized zirconia or gadolinium zirconate; and the bondcoat is an MCrAlY.

A further embodiment of any of the foregoing embodiments may additionally and/or alternatively further comprises: for at least some of the outlet passageways, laser ablating a diffuser into the ceramic, bondcoat, and substrate; and through the diffuser, electrodischarge machining of remaining portions of the at least some of the outlet passageways.

A further embodiment of any of the foregoing embodiments may additionally and/or alternatively further comprise casting the substrate in a shell over one or more casting cores, the one or more casting cores casting the feed passageways.

In a further embodiment of any of the foregoing embodiments, additionally and/or alternatively, the component is a blade having: a root having one or more inlet ports; an airfoil having internal passageways for receiving air flow from the one or more inlet ports; and said outlet passageways being along the airfoil.

A further aspect of the disclosure involves a coated component comprising: a metallic substrate; a metallic bondcoat; a ceramic coating having one or more ceramic coating layers atop the bondcoat; and a cooling passageway system. The cooling passageway system comprises a plurality of feed passageways extending from one or more inlet ports and a plurality of outlet passageways. The outlet passageways have: an inlet opening; an outlet opening in the coating; a metering section; and a diffuser section between the metering section and the outlet opening. The outlet passageways further comprise an aluminization along the metering section and diffuser section.

In a further embodiment of any of the foregoing embodiments, additionally and/or alternatively, the coated component comprises an airfoil having a pressure side and a suction side and wherein the outlet passageways are along the pressure side or suction side.

In a further embodiment of any of the foregoing embodiments, additionally and/or alternatively, the aluminization is on the substrate and the bondcoat.

In a further embodiment of any of the foregoing embodiments, additionally and/or alternatively, the bondcoat is an MCrAlY.

In a further embodiment of any of the foregoing embodiments, additionally and/or alternatively, the ceramic does not penetrate the bondcoat.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

An example metallic substrate to be coated is a cast substrate. An example cast substrate is a blade substrate precursor (lacking final machining steps). As an example blade, the substrate may be a cast Ni-base superalloy substrate (e.g., single-crystal, (SX)). An example blade substrate precursor is for an internally-cooled blade wherein the precursor is cast (e.g., investment cast) with at least feed passageways (e.g., cast via ceramic feedcore) and optionally some to all of its outlet passageways. For example, a trailing edge discharge slot may be cast such as via the feedcore or a refractory metal core (RMC) assembled thereto; whereas, leading edge and other film cooling holes along the lateral surface of the airfoil may subsequently be drilled or otherwise machined (e.g., electrodischarge machining (EDM) discussed further below).

As is discussed below, the ultimate article (e.g., blade in the example) has coated, namely aluminized, internal cooling passageways plus one or more differently-coated exterior areas/regions. In at least one of those exterior areas/regions, the coating includes a bondcoat and a ceramic coating (e.g., in one or more layers, a thermal barrier coating (TBC), an environmental barrier coating (EBC), and/or an abradable coating).

Example bondcoat source material may be a conventional MCrAlY. Specific examples are high-chromium MCrAlY. An example high-Cr MCrAlY may have by weight Al of 5.0% to 15.0% (more narrowly 6.0% to 12.0%) and Cr of 15.0% to 50.0% (more narrowly 25.0% to 40.0%) and/or an Al:Cr weight ratio of 1:3 (more broadly 1:1.5 to 1:10 or 1:2 to 1:6 or 1:3 to 1:5).

An alternative example high-Al MCrAlY may have by weight Al of 5.0% to 15.0% (more narrowly 10.0% to 13.0%) and Cr of 5.0% to 25.0% (more narrowly 15.0% to 23.0%) and/or an Al:Cr weight ratio of 1:1.5 (more broadly 1:1.3 to 2:1 or 1:1.1 to 3:1).

However, the process may use MCrAlY source material that might otherwise be used in the industry.

Figure 1:
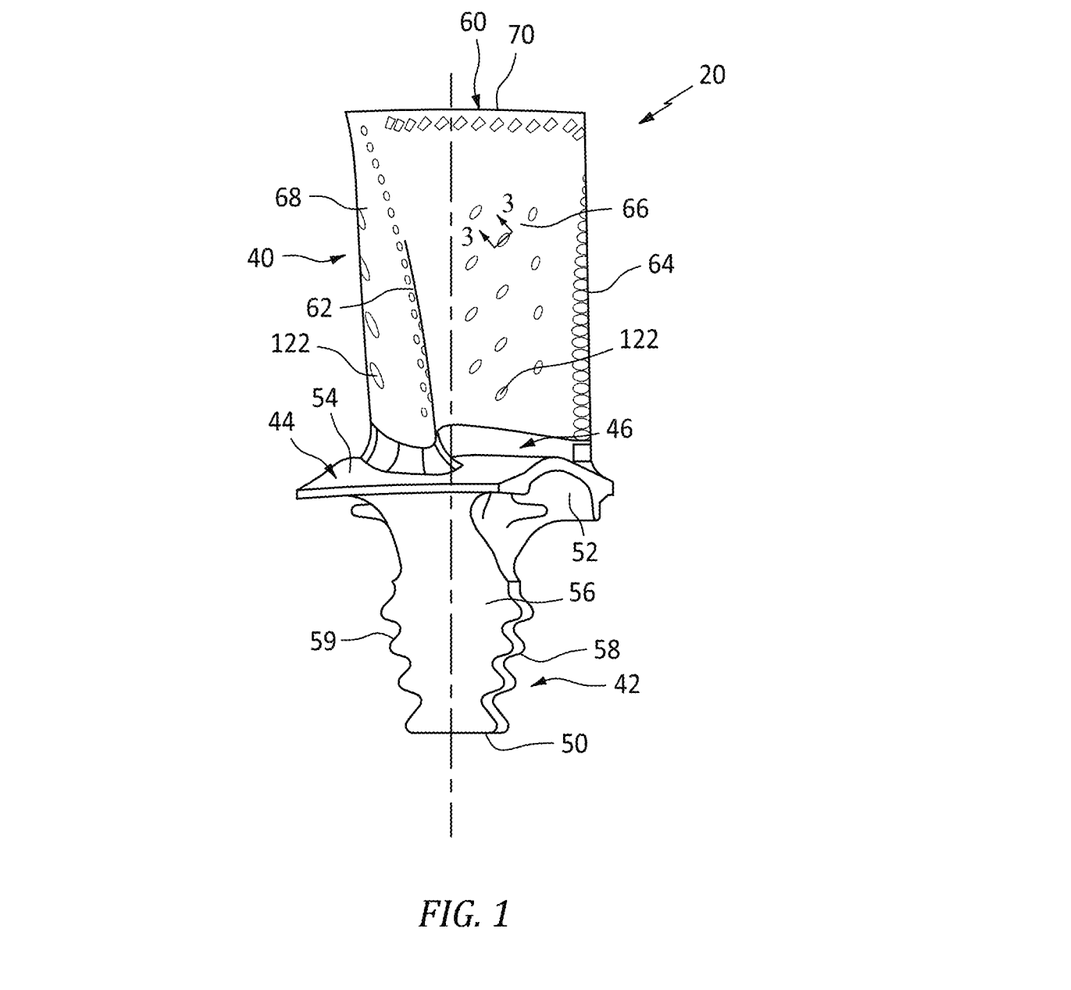
FIG. 1 is a view of a gas turbine engine blade.
Figure 2:
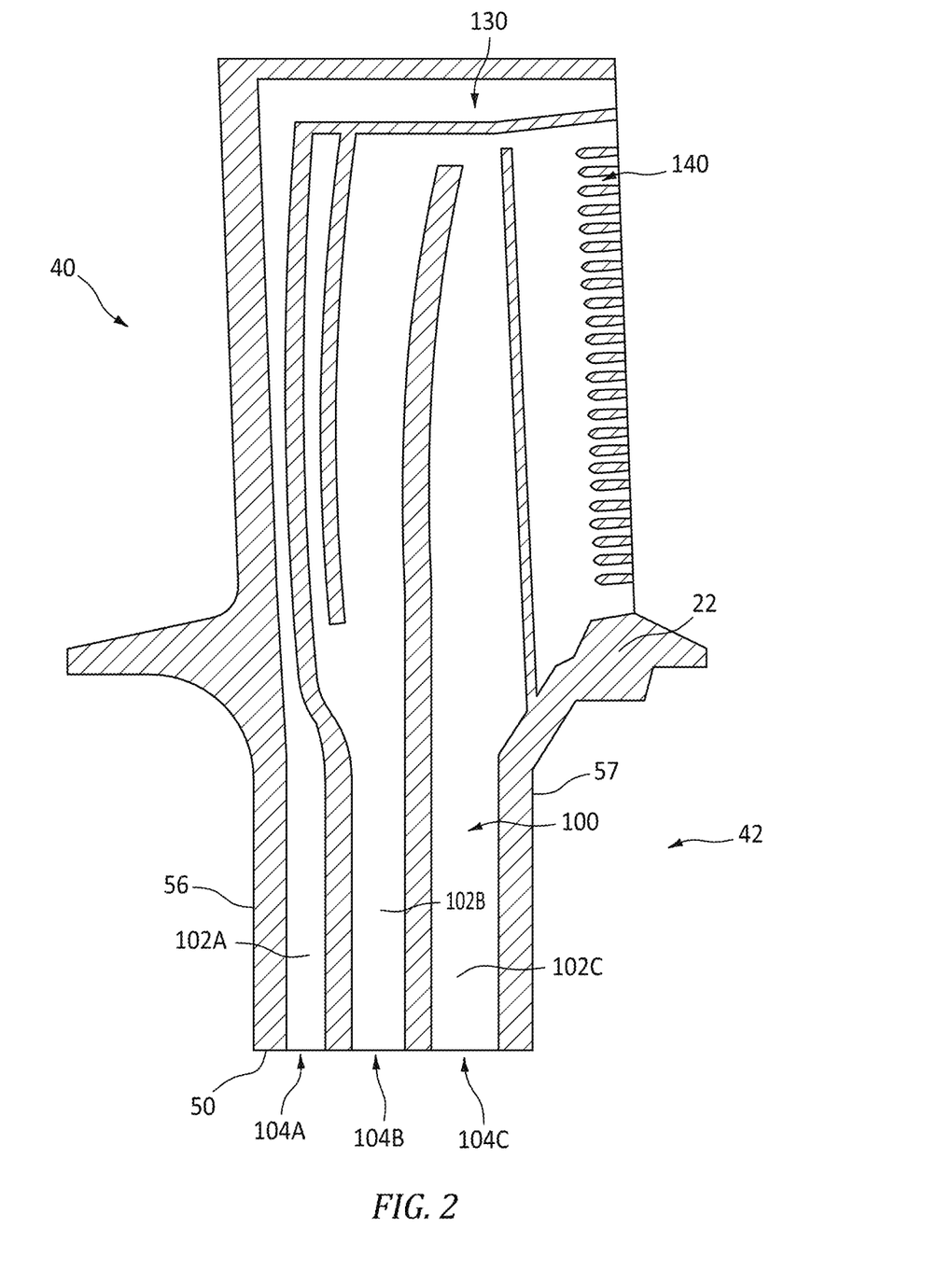
FIG. 2 is a schematic chordwise cross-sectional view of the blade.

FIG. 1 shows an example article 20 as a blade. The blade comprises a metallic substrate 22 (FIG. 2). An example substrate comprises a unitary metallic casting (e.g., a single-crystal (SX) casting of a nickel-based superalloy) and defines the overall gross features of the blade. The substrate and blade thus include an airfoil 40 and an attachment feature 42 (e.g., a firtree root). The blade and substrate may further include a platform 44 between the airfoil and the firtree root.

The firtree root 42 extends from an inboard end (inner diameter (ID) face) 50 forming an inboard end of the blade to an outboard end at an underside 52 of the platform. The airfoil 40 extends from an inboard end at a fillet 46 joining an outer surface (gaspath-facing surface) 54 of the platform to a tip 60. The airfoil extends from a leading edge 62 to a trailing edge 64 and has a pressure side surface 66 and a suction side surface 68.

The tip 60 has a primary radially-outward facing surface 70. The surface 70 may at least partially surround a tip squealer pocket (not shown) extending radially inward from the tip surface 70. In some embodiments, an abrasive coating may be applied along the surface 70 and the TBC system may be applied along the pressure and suction side surfaces of the airfoil, the fillet, and the gaspath-facing surface of the platform.

The root has a front (fore) face 56, an aft face 57, a first side 58, and a second side 59.

FIG. 2 shows the cooling passageway system 100 as including multiple trunks 102A, 102B, 102C extending from respective inlets 104A, 104B, 104C along the inner diameter face 50 of the root. Depending upon blade configuration, the trunks may branch in multiple spanwise cavities optionally with turns such that a cavity with tipward flow is termed an up pass and a cavity leg with rootward flow is termed a down pass. FIG. 1 shows film cooling outlet passageways 122 along the pressure side and suction side. Various of the cavity legs may discharge to the tip/tip pocket. Additionally, there may be a tip flag leg 130 (FIG. 2) passing in a rearward to the trailing edge from one of the more forward trunks. The exemplary trailing edge slot 140 is fed by the most rearward trunk.

As discussed below, at least some of the outlet passageways 122 have inboard/inner metering sections 124 (FIG. 3) extending from an associated inlet 127 on the interior surface and outer/outboard diffuser sections 126 diverging outward from the metering section to an associated outlet 128 on the outer surface.

The blade further comprises a first coating 24 (FIG. 3) along the blade airfoil pressure and suction sides and platform gaspath surface as noted above. As is discussed further below, the example first coating 24 is a thermal barrier coating (TBC) system and/or environmental barrier coating (EBC) system including an MCrAlY bondcoat 28 and one or more ceramic layers 30.

An example MCrAlY bondcoat is a NiCrAlY or a NiCoCrAlY. For example, it may be as in the '416 patent. It may be applied by plasma spray or physical vapor deposition to an example thickness of 20 micrometers to 200 micrometers.

Example ceramic layers are yttria-stabilized zirconia or gadolinium zirconate applied by plasma spray or physical vapor deposition. For example, 59% $Gd_2O_3$, balance ZrO applied by physical vapor deposition. It may be applied to an example thickness of 20 micrometers to 500 micrometers, more particularly 75 micrometers to 300 micrometers.

Figure 3:
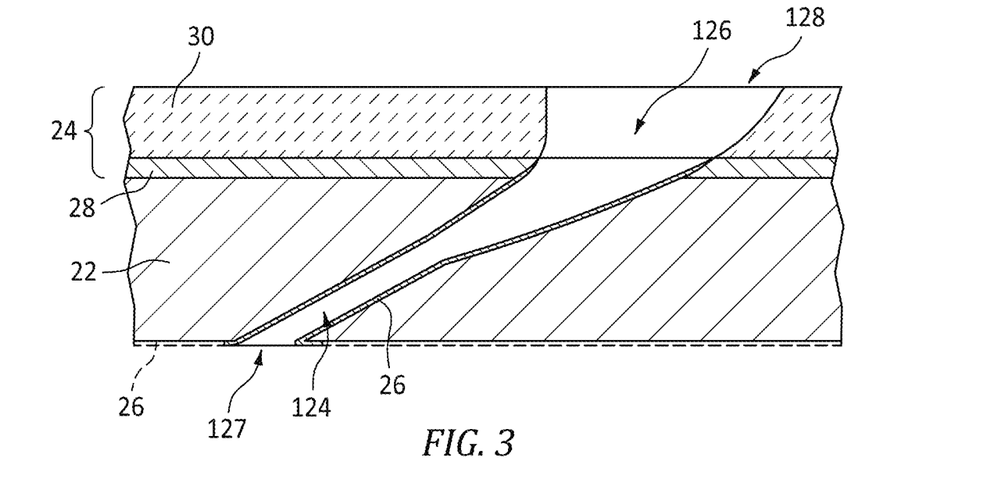
FIG. 3 is a schematic cross-sectional view of the blade taken along line 3-3 of FIG. 1 and showing a gaspath-facing coating and a cooling passageway coating.

The blade further comprises a second coating 26 (FIG. 3). The second coating 26 is substantially an aluminide environmental resistant coating principally on an interior of the blade, at least including portions of the passageways 122. In the example, the coating 26 extends into the passageways 122 along the metering section 124 and into the diffuser 126.

The substrate may be formed by a conventional investment casting process or other existing or yet-developed process. In an example investment casting process, the substrate is cast in a shell over a casting core or core assembly that includes one or more ceramic cores for casting key passageway sections including feed passageways and optionally including cooling passageways and potentially some outlet passageways if present. Additionally, refractory metal cores (RMC) of the assembly may be used to cast cooling and/or outlet passageways. However, as discussed below, at least some of the outlet passageways 122 are machined/drilled at a later stage intermediate in the coating process.

After deshelling (e.g., mechanical breaking) and decoring (e.g., acid leaching and/or alkaline leaching and/or thermo-oxidative decomposition) there may optionally be additional cleaning and preparation steps including machining and grit blasting. The bondcoat 28 is applied to key gaspath-facing surfaces of the component (e.g., airfoil pressure and suction side surfaces and platform gaspath (outer diameter (OD)) surface. Example bondcoat is metallic (e.g., an MCrAlY) and may be applied by known or yet-developed techniques such as low pressure plasma spray (LPPS) or cathodic arc deposition.

In the example, after bondcoat application and before ceramic application, there may be additional finish machining of mounting or other surfaces such as the root of the blade or analogous platform or shroud mounting lugs, tabs, and the like of vanes.

After bondcoat application, one or more layers of ceramic coating 30 (thermal barrier coating (TBC)) are applied atop the bondcoat. Example materials are yttria stabilized zirconia (YSZ such as 7YSZ) and gadolinia zirconate (GdZ or GZO). Example TBC application techniques include vapor deposition (e.g., electron beam physical vapor deposition (EBPVD)) and plasma spray (e.g., suspension plasma spray or solution plasma spray).

Figure 4:
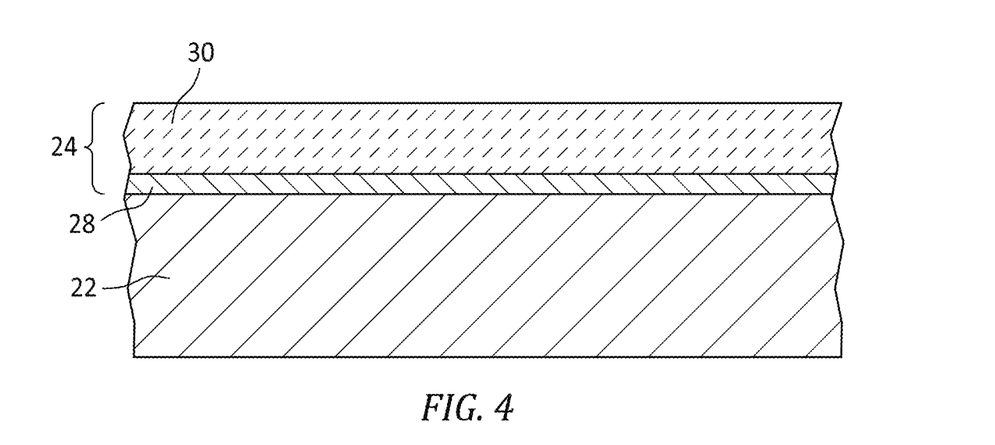
FIG. 4 is a schematic cross-sectional view of the blade taken after bondcoat and barrier coat.
Figure 5:
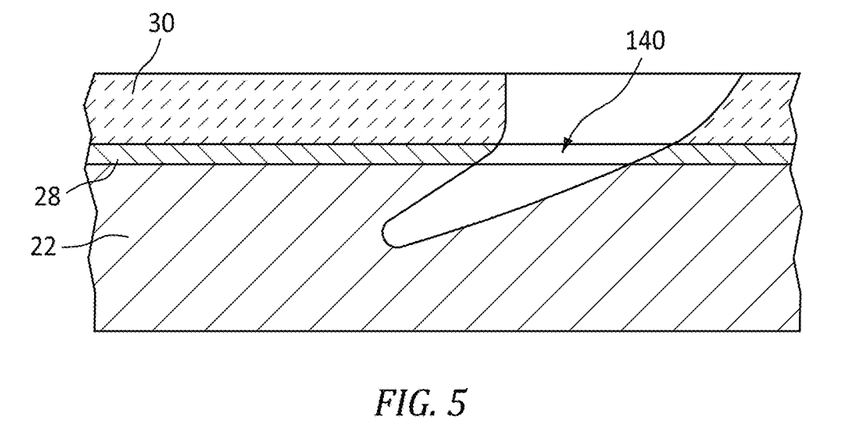
FIG. 5 is a schematic cross-sectional view of the blade after diffuser machining.
Figure 6:
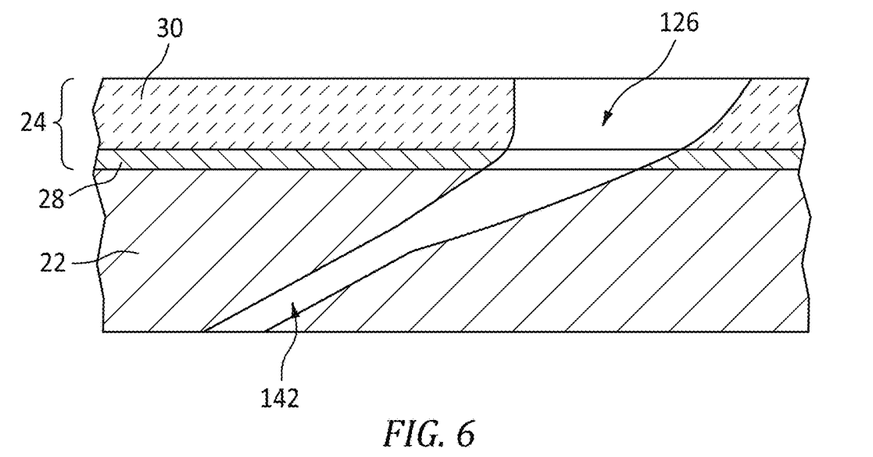
FIG. 6 is a schematic cross-sectional view of the blade after outlet passage metering section machining.

At this point (after ceramic application) (FIG. 4), at least some of the outlet passageways (holes) 122 have not yet been formed. For example, for many applications, trailing edge outlets may be cast over the core assembly but film cooling outlets along the pressure side and the suction side are to be subsequently machined/drilled. In one group of examples, as a precursor to the drilling or as a portion of a broader machining/drilling step, an initial step is forming precursors (precursor recesses) 140 (FIG. 5) of the diffusers for the subject outlet passageways. Example diffuser (precursor) formation is laser ablation into the ceramic layer(s) 30, bondcoat 28, and partially into the substrate 22. The resulting laser-ablated recesses 140 are shaped to taper inward (and thus expand outward to serve as a diffuser) and provide access for machining/drilling the remainder of the subject outlet passageway. This remainder 142 (FIG. 6) forms a narrower diameter (circular or other cross-sectional area) precursor of the metering section. In an EDM example, the EDM electrodes pass into the intact substrate via the ablated recesses 140 and ultimately break through to interior surface along the cast feed or cooling passageways.

As is discussed further below, laser machining and EDM have a tendency to deplete aluminum, leaving a depthwise region extending inward from the machined surface with lower aluminum content than the original substrate and undisturbed substrate below. Such depletion may render the aluminum-depleted material more subject to oxidation than the original/undisturbed substrate. Thus, local aluminization to replenish aluminum may be particularly useful.

Figure 7:
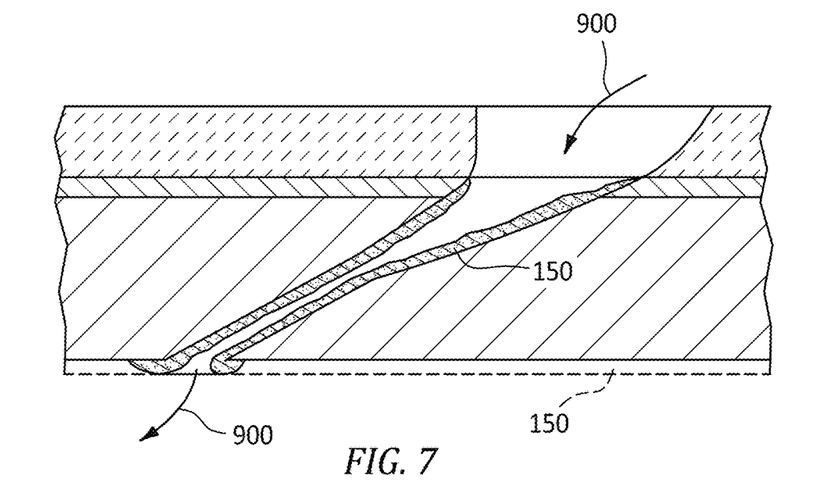
FIG. 7 is a schematic cross-sectional view of the blade after aluminization slurry application and during aluminization.

For internal aluminization to form the layer 26, a slurry aluminide 150 (FIG. 7) is used. The example slurry aluminide contains Al—Si or Al—Si—Y powder (e.g., 50% to 90% by weight) in a solvent/carrier. An example solvent/carrier is water. See the '765 patent which shows a pack aluminization including a halide activator and inert filler. However, there may be no or limited halide (e.g., $AlCl_3$) activator. For example, the amount may be zero to 20% by weight in order to become a species carrier. There also may be limited or no inert filler (e.g., alumina or silica) in order to facilitate removal and avoid plugging outlet/discharge passageways. Thus, alumina and silica, if any, may be not more than an example 40% by weight, preferably not more than 10% or essentially zero. Normally such filler modulates the activator. Various commercial aluminization products may be used. Some of these include additives such as polymers or gelling agents to maintain the applied material in place for the heating.

In the example, the slurry is introduced by syringe injection through the outlet passageways and/or brushing over the outlet passageways. An alternative is aerosolized spray via air brush. Syringe injection may be effective to drive the slurry all the way through the outlet passageways to the feed or cooling passageways. Depending on fluid properties of the slurry, surface tension may assist/cause the transport of the slurry deeper into or through the outlet passageways. Depending on viscosity and surface tension properties as well as the application technique, the process may leave the outlet passageways full of slurry or surface coated with slurry leaving a narrow void (see FIG. 7). Even when plugged, subsequent drawing of vacuum will open a void and leave surface coating. Even if not fully transported to the outlet passageway inlets, drawing of the vacuum will draw the slurry further inward to such inlets.

In some implementations, the coating of the outlet passageway is all that is necessary. For example, to the extent that feed or other cooling passageways are not laser drilled or electrodischarge machined, they may not suffer from similar aluminum depletion which needs to be fixed. Additionally, the relatively large size of such feed and cooling passageways compared with the outlet passageways (particularly the metering section 124) means that subsequent oxidation of non-aluminized feed or cooling passageway surface does not unduly proportionately narrow such passageways. Whereas a thin oxidation layer developing may excessively proportionately throttle the metering section. However, other embodiments may include interior surface aluminization. This may be achieved by more conventional introduction of slurry through the root inlets. Thus, FIG. 7 optionally shows, via broken line, an extent of slurry along the internal passageways beyond that which might occur just from introducing to the outlet passageways. The FIG. 3 broken line showing is of the associated aluminization. Even where significant aluminization along the feed passageways is not present, slurry drawn in by the vacuum source may locally wet such surfaces and create some amount of local aluminization.

The feed passageway inlets 104A-C are then plumbed to a suction pump 820 (FIG. 8) (e.g., by mating with a fixture/adapter 822 that holds one or more blades). The example fixture has respective passageway spigots that insert into root ID inlets of the blades.

Figure 8:
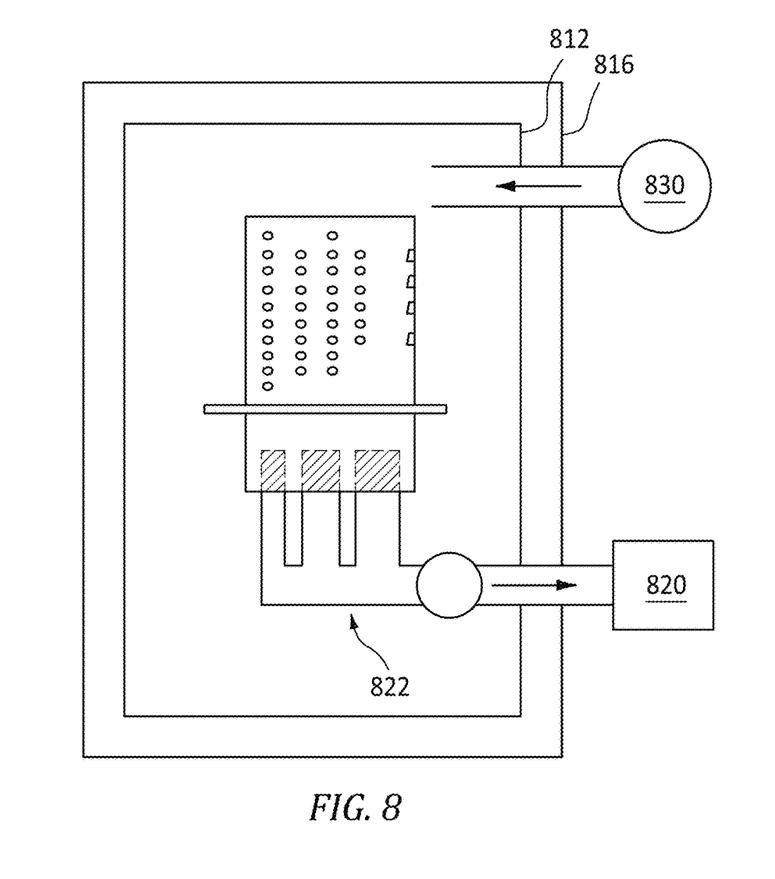
FIG. 8 is a schematic side sectional view of an aluminizing retort and furnace.
Figure 9:
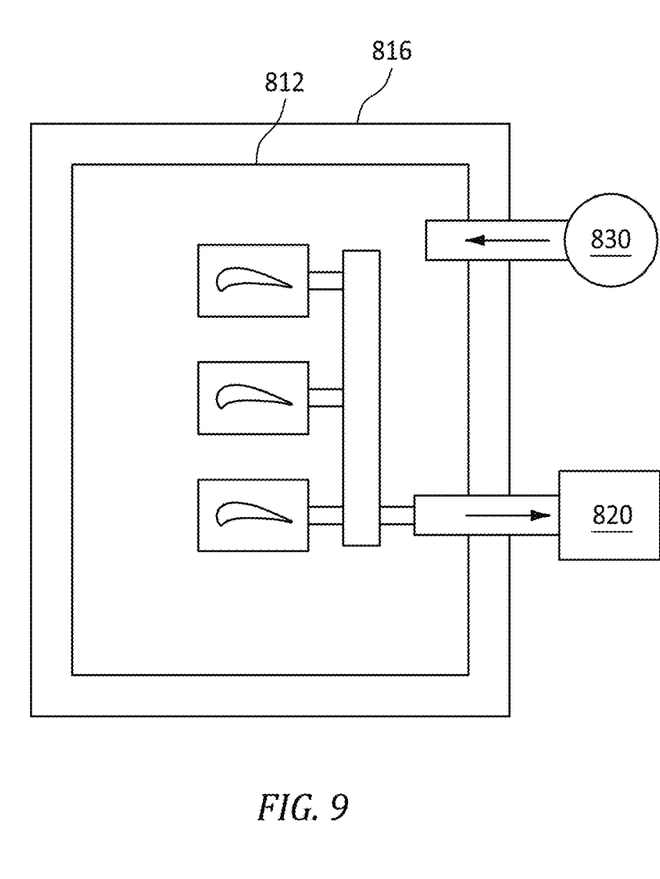
FIG. 9 is a schematic top sectional view of the retort and furnace.

The blades and fixture are then placed in a sealed retort 812 inside a heat treatment furnace 816. The retort is coupled to a gas source 830 (e.g., pressurized cylinder(s)) such as by stainless steel tubing and fittings. The example gas delivered from the source is at least 50% by volume argon, hydrogen, and/or helium, more particularly, at least 90% or at least 99%. The retort functions to protect the furnace from exposure to the aluminization components and introduce gas (particularly if the gas includes hydrogen or other reactive component rather than just inert gas). Example retort materials are nickel-based superalloys or composites (e.g., silicon carbide composites).

Gas flow and vacuum drawing are initiated so that the gas takes a reverse flowpath 900 (FIG. 7) through the blade relative to the ultimate cooling air (flowing in through the outlet passageways to the cooling (if any) and feed passageways) and therefrom out the inlets 104A-C.

Heating commences after gas flow has started and the gas flow is maintained throughout the heating and into or through a cooldown phase. The heating is to a temperature of at least 750° C., more narrowly at least 1000° C. (e.g., 750° C. to 1200° C. or 1000° C. to 1200° C.). During the heating, the slurry powder melts and starts wetting and diffusing into exposed metal surfaces. If activator is present activator will also carry halide vapor to metallic surfaces and coat.

After sufficient time at temperature, the heating may be discontinued (e.g., turning off resistive heaters) and the component allowed to cool via the gas flow. When a sufficiently low temperature has been achieved (e.g., 800° F. (427° C.)), the gas flow may be interrupted, the vacuum pumping interrupted, and the seal broken. The component may be removed and de-fixtured.

The result will be to aluminum-enrich a layer along internal feed and cooling passageways relative to original/underlying substrate while a layer along the outlet passageways will enrich to at least be less aluminum-depleted than upon machining. In some embodiments, the enrichment may be sufficient so that the formerly depleted region becomes more aluminum-rich than the original substrate (pre-depletion).

For example, a baseline substrate material is a nickel-based superalloy having an aluminum content of an example aluminum content of 5.0 to 8.0 weight percent. Example such alloys have Ni as the largest by weight component (typically over 50 percent) with Co and Cr contents in the 4.0 to 12.0 weight percent range as well as various alloyants and impurities. The initial aluminum depletion via laser drilling or EDM may be by a delta of at least 2.0% (for example also representing at least 20% of the original substrate aluminum) over a depth of at least 5.0 micrometers. After aluminization, along the cast passageway surfaces aluminum content will be enriched above the original such as by a delta of at least 5.0% over a depth of at least 5.0 micrometers (e.g., 5.0 micrometers to 75 micrometers). However, along the laser drilled or EDM outlets, the enrichment may be of a similar delta but to a lower total. An example aluminum increase is by a delta of 5.0% to 30% or 10.0% to 30%.

After such coating, there may still be further steps such as cosmetic grit blast. An example grit blast includes an interior grit blast to remove excess slurry. This may be performed aiming the grit gun into the root inlets. Optionally, a rubber boot may be attached to the grit nozzle and inserted into the feed passageways. Additionally, exterior grit blast may be performed with low pressure grit blast system to avoid barrier coating removal.

Ceramic coating before outlet passageway formation reduces issues from coat-down of the passageway relative to ceramic coatings applied after passageway machining. Coat-down may require an additional machining step. This additional machining step (e.g., laser drilling) has disadvantages of cracking/spalling of ceramic and difficulties of alignment of the laser.

As noted above, laser ablation of the diffuser precursor and EDM of the metering section precursor will locally deplete substrate aluminum. Accordingly, extending the aluminizing into the outlet passageways will at least partially replenish. This is distinguished from performing such laser ablation and EDM after internal aluminization or filling pre-formed outlet passageways with maskant prior to aluminization.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline component or process, details of such baseline may influence details of particular implementations. Accordingly, other embodiments are within the scope of the following claims.

What is claimed is:

1. A method for coating a component, the component comprising:
   a metallic substrate;
   a ceramic coating having one or more ceramic coating layers atop the substrate; and
   a cooling passageway system comprising a plurality of feed passageways extending from one or more inlet ports and a plurality of outlet passageways, the plurality of outlet passageways having openings in the coating,
   the method comprising:
      applying an aluminizing slurry to the plurality of outlet passageways;
      coupling the one or more inlets to a suction source;
      applying an external gas flow to the component, the suction source drawing gas from the external gas flow in through the outlet passageways and out through the one or more inlet ports, the external gas flow comprising at least 50% by volume combined one to all of Ar, He, and $H_2$; and
      while the suction source is drawing the gas from the external gas flow, heating the component to aluminize the cooling passageway system.

2. The method of claim 1 wherein:
   the heating is at a temperature of at least 1000° C.

3. The method of claim 1 wherein the aluminizing slurry comprises:
   Al—Si and/or Al—Si—Y powder in a carrier.

4. The method of claim 1 wherein the aluminizing slurry comprises:
   no more than 10% by weight combined alumina and silica, if any.

5. The method of claim 1 wherein the aluminizing slurry is introduced by:
   injection from outlets of the outlet passageways.

6. The method of claim 1 wherein:
   the external gas flow is commenced prior to the heating and maintained throughout the heating.

7. The method of claim 1 further comprising:
   interior and exterior grit blast after the aluminizing of the cooling passageway system.

8. The method of claim 1 wherein:
   the component is held by a fixture in a sealed retort in a heat treating furnace for the heating.

9. The method of claim 8 wherein:
   the retort is a nickel-based superalloy or silicon carbide composite.

10. The method of claim 1 wherein:
    the metallic substrate is a nickel-based alloy.

11. A manufacture method including the method of claim 1 and further comprising:
    applying a bondcoat to the substrate; and
    applying the ceramic coating atop the bondcoat.

12. The method of claim 11 wherein:
    the bondcoat is an MCrAlY.

13. The method of claim 11 wherein:
    the ceramic coating does not penetrate the bondcoat.

14. The method of claim 11 wherein:
    the ceramic coating is a yttria-stabilized zirconia or gadolinium zirconate; and
    the bondcoat is an MCrAlY.

15. The method of claim 14 wherein:
    the aluminization is on the substrate and the bondcoat.

16. The method of claim 11 further comprising:
    for at least some of the plurality of outlet passageways, laser ablating a diffuser into the ceramic, bondcoat, and substrate; and
    through the diffuser, electrodischarge machining of remaining portions of the at least some of the plurality of outlet passageways.

17. The method of claim 16 further comprising:
    casting the substrate in a shell over one or more casting cores, the one or more casting cores casting the plurality of feed passageways.

18. The method of claim 16 wherein the component is a blade having:
    a root having one or more inlet ports;
    an airfoil having internal passageways for receiving air flow from the one or more inlet ports; and
    said plurality of outlet passageways being along the airfoil.

19. The method of claim 18 wherein:
    the plurality of outlet passageways each have a metering section and a diffuser section between the metering section and the associated opening; and
    the heating aluminizes the metering section and the diffuser section.

20. The method of claim 19 wherein:
    the airfoil has a pressure side and a suction side; and
    the plurality of outlet passageways are along the pressure side or the suction side.

* * * * *